Sept. 8, 1959     R. A. GURRIES ET AL     2,902,979
LEVEL CONTROL SYSTEM FOR TRACTOR-MOUNTED TOOL MEMBERS
Filed Nov. 13, 1956     2 Sheets-Sheet 1

INVENTORS
R.A. Gurries
J. Curlett
BY
ATTYS

Sept. 8, 1959  R. A. GURRIES ET AL  2,902,979
LEVEL CONTROL SYSTEM FOR TRACTOR-MOUNTED TOOL MEMBERS
Filed Nov. 13, 1956  2 Sheets-Sheet 2
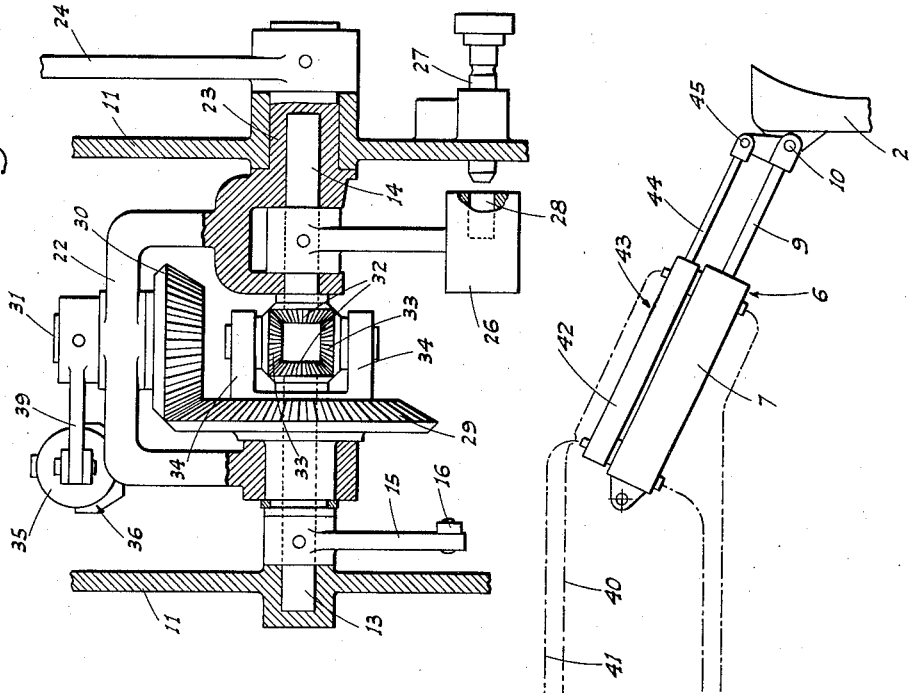
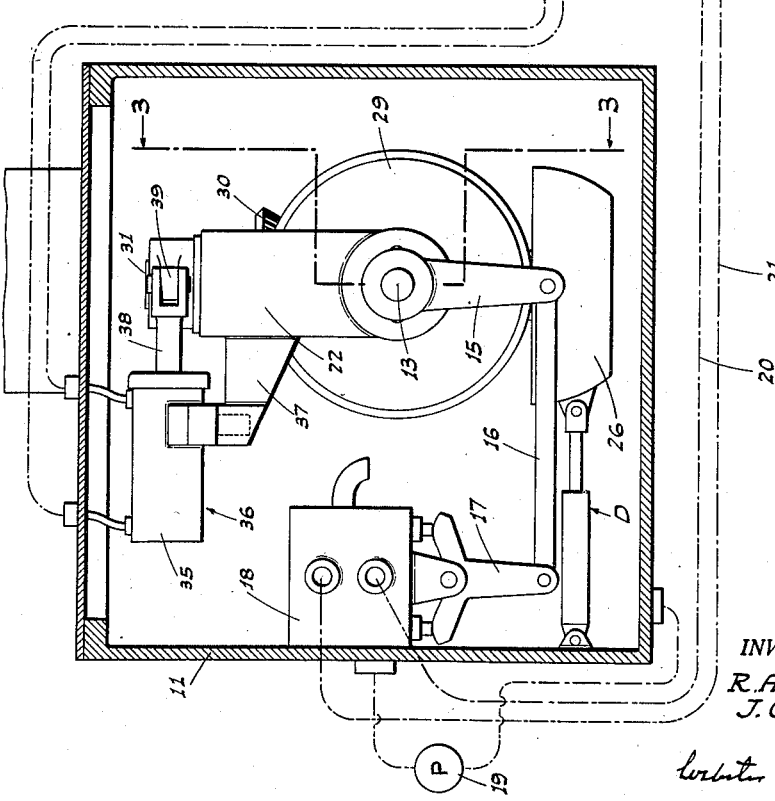
INVENTORS
R.A. Gurries
J. Curlett
ATTYS

United States Patent Office 2,902,979
Patented Sept. 8, 1959

2,902,979

LEVEL CONTROL SYSTEM FOR TRACTOR-MOUNTED TOOL MEMBERS

Raymond A. Gurries, San Jose, and John Curlett, Los Gatos, Calif., assignors to Gurries Manufacturing Co., San Jose, Calif., a corporation of California Application November 13, 1956, Serial No. 621,689

4 Claims. (Cl. 121—41)

This invention relates to tractor-mounted ground working tools whose ground working depth or level are maintained by hydraulic rams, and is a continuation-in-part of our application, Serial No. 494,738, filed March 16, 1955, now U.S. Patent No. 2,778,130, dated January 22, 1957.

The principal object of the present invention is to provide a novel automatically functioning device which will adjust and maintain the tools at a predetermined level relative to the tractor as the latter pitches or tilts, without the operator having to manually control the adjusting or compensating movement of the tools.

At the same time, means is provided as a part of—and in connection with—said device, to enable the operator to manually control the adjustment of the tool member at any time, and without depending on tractor tilt to accomplish such adjustment.

It is also an object of the invention to provide a practical and reliable level control system for tractor-mounted tool members which will be exceedingly effective for the purpose for which it is designed.

These objects are accomplished by means of such structure and relative arrangement of parts as will fully appear by a perusal of the following specification and claims.

In the drawings:

Fig. 2 is an enlarged side elevation of the main unit of the control device; the enclosing housing thereof being shown in section. The view includes a diagrammatic showing of the conduit system between said unit and the bulldozer ram, and in said view the fluid control valve of the unit is shown in its neutral or closed and holding position.

Fig. 3 is a fragmentary transverse section on line 3—3 of Fig. 2.

Figure 1:
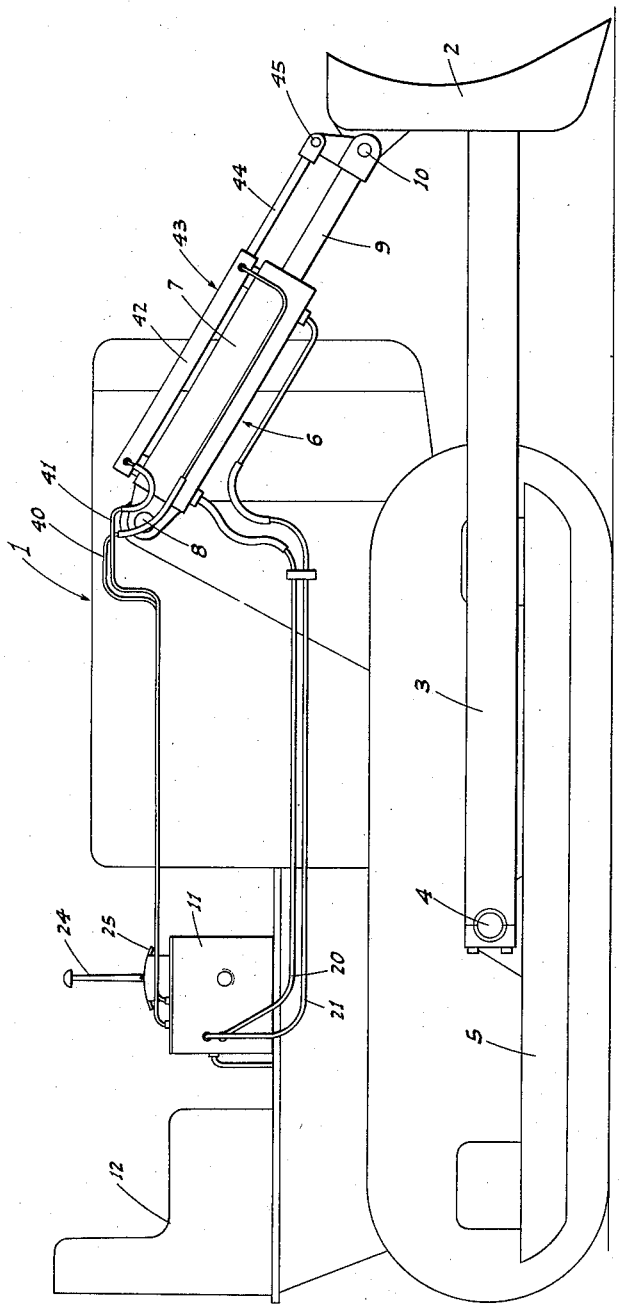
Fig. 1 is a side outline of a conventional crawler-type tractor equipped with a ground working tool in the form of a bulldozer, and a hydraulic ram for raising and lowering the same; the view showing the improved ram control device mounted on the tractor and operatively connected to the bulldozer and ram.

Referring now more particularly to the drawings, and to the characters of reference marked thereon, the structure to which the control device is applied comprises essentially a tractor, indicated generally at 1, on which the tool member to be controlled is mounted. In the present instance, such tool member is shown as being a bulldozer 2, which includes rearwardly projecting side beams 3 pivoted, as at 4, on the side frames 5 of the tractor.

Hydraulic rams, one of which is indicated at 6, control the raising and lowering of the bulldozer about pivots 4. Each ram comprises a cylinder 7 pivoted at its rear end at a fixed point on the tractor, as at 8, and a piston rod 9 pivoted at its forward end on the bulldozer, as at 10. The ram 6 is arranged relative to the pivot 4 so that as the ram is contracted or extended, the bulldozer will be raised or lowered, respectively.

The control device for automatically operating the ram comprises a housing or case 11 in which the main control mechanism is enclosed, and which case is mounted on the tractor in a position accessible from the tractor operator's seat 12.

Journaled in the case 11 are separate but alined transverse shafts 13 and 14. Depending from, and rigid with, shaft 13 is an arm 15 which is connected by a link 16 with the rockable actuating arm 17 of a four-way valve 18 fixed in the case 11. The valve as here shown is of the type shown in the copending application of John Curlett, Serial No. 477,830, filed December 27, 1954, now U.S. Patent No. 2,804,933.

Pressure is supplied to the valve from a pump 19 on the tractor; the valve discharging into case 11 and the pump taking its oil from said case, which forms a reservoir.

One conduit 20 from the valve leads to one end of the ram 6, while another conduit 21 leads from the valve to the other end of the ram. The conduits are connected to the ram and valve in such relation that when arm 17 swings forwardly, communication is established between the pump and the rear end of the ram through conduit 20 to lower the bulldozer, and between the forward end of the ram and the case 11 through conduit 21.

Similarly, when arm 17 swings rearwardly, fluid is fed to the forward end of the ram to raise the bulldozer through conduit 21, and is relieved into case 11 through conduit 20.

A rigid yoke 22 upstands from shafts 13 and 14 and is turnable thereon; said yoke at the side opposite shaft 13 including a hub 23 in which the adjacent end of shaft 14 is journaled, and which hub is journaled in—and projects through—the adjacent side wall of the case 11. A hand lever 24 upstands from the projecting portion of hub 23, and is operatively associated with a holding quadrant 25 of conventional character mounted on the adjacent side of the case 11.

A pendulum 26 is secured on—and depends from—shaft 14; a normally retracted, manually actuated holding pin 27 being mounted in the adjacent side wall of case 11 in position to a socket 28 in the pendulum when the latter is in its neutral position in the case. Undue freedom or ease of swinging of the pendulum is prevented by a dashpot unit D connected to the pendulum and case.

A bevel gear 29 is turnable on shaft 13, and is in mesh with a pinion 30 whose axial spindle 31 is turnably mounted in—and projects above—the top of the yoke 22. Facing bevel gears 32 are fixed on the adjacent ends of shafts 13 and 14, and are in mesh with opposed bevel gears 33 journaled in arms 34 projecting from, and rigid with, gear 29.

The cylinder 35 of a hydraulic cylinder unit 36 is mounted on a bracket 37 rigid with yoke 22, while the piston rod 38 of such unit is connected to a radial arm 39 secured to the pinion spindle 31.

The front and rear ends of cylinder 35 are connected by conduits 40 and 41 to the corresponding ends of the cylinder 42 of another hydraulic unit 43 which includes a piston rod 44.

Unit 43 is mounted in connection with the bulldozer control ram 6; the cylinder 42 being fixed on—and extending lengthwise of—the ram, while the piston rod 44 is secured in connection with the outer end of the piston rod 9 of the ram, as shown at 45.

Cylinders 35 and 42, and their connecting conduits, are completely filled with hydraulic fluid; the relative sizes of the cylinders being such as to give the necessary stroke movement of the piston rod 38 with a full-stroke movement of the piston rod 9.

With the above described arrangement of parts, the operation of the device, after the bulldozer has been set to cut at a certain level, is as follows:

Assuming that the tractor dips or tilts down toward the front during its forward movement, the case 11 assumes a corresponding tilt. The bulldozer, being rigid with the tractor and in front of the same, digs more deeply than intended into the ground. The pendulum 26 however remains in a vertical position, or relatively swings toward the front of the case. The shaft 14 to which the pendulum is connected is thus rotated, and through gearing 32—33 shaft 13 is rotated also, to open valve 18 to the forward end of the ram 6, so as to contract the ram and raise the bulldozer.

Since the cylinder unit 43 is mounted in fixed connection with the ram, said unit is contracted to the same extent. This forces fluid from the rear end of cylinder 42 into cylinder 35 of unit 36 and extends the latter. This causes pinion 30 to be rotated, which imparts rotation to gear 29. Through the differential gearing 32—33, the shaft 13 is also rotated; the direction of rotation being the opposite of that initially imparted to said shaft, so that the valve 18 is returned to a closed position. The ram 6 is therefore held in a position to maintain the bulldozer in its relatively raised position.

As the tractor then reassumes its initial level position and the pendulum swings back, the shaft 13 is turned in the opposite direction to reopen the valve 18 so as to admit fluid to the rear end of the ram, so as to extend the same and lower the bulldozer.

At the same time, the cylinder unit 36 is actuated by the accompanying extension of cylinder unit 43, which rotates the shaft 13 as previously described but in a direction to again close the valve 18. The bulldozer is thus restored to its original set position relative to the ground. If the tractor tilts upwardly toward the front and the bulldozer is correspondingly raised, the automatic control device functions in the same manner as above described, but with a movement of the parts in the opposite direction.

If at any time it is desired to control the position of the bulldozer by hand, and without the automatic mechanism being used, it is only necessary to lock the pendulum against movement by advancing the pin 27. The valve 18 may then be actuated by movement of the lever 24. Such movement turns the yoke 22 in the same direction, and gear 29 is rotated by the pinion 30, which at the time is held against rotation by the cylinder unit 36. Rotation of gear 29 imparts rotation to shaft 13 through the interconnected differential gearing 32—33.

The normally closed valve 18 is thus opened to one end of the other of ram 6, depending on the direction of rotation of yoke 22 and shaft 13, by reason of the connection of said shaft with the valve actuating arm 17. Fluid is thus fed to the ram 6 until the bulldozer is at the desired level, and which depends on the distance the lever has been moved. As the bulldozer is thus shifted, the cylinder unit 36 is actuated, as previously described, to turn shaft 13 in the opposite direction and close valve 18.

Thus, with any predetermined amount of lever movement, the bulldozer will be moved an exact proportional amount, and will then stop without the operator having to move the lever back to its original position to halt the movement of the blade.

It may be here noted that while we have here shown the tool as being a bulldozer, mounted on the forward end of a tractor, the automatic control device may also be used to control the level of working depth of other forms of tool members, whether mounted at the front or rear end of the tractor, as long as such members are hydraulically controlled and are normally rigid with the tractor.

From the foregoing description it will be readily seen that there has been produced such a device which will substantially fulfill the objects of the invention, as set forth herein.

While this specification sets forth in detail the present and preferred construction of the device, such deviations therefrom may be resorted to as do not form a departure from the spirit of the invention, as defined by the appended claims.

Having thus described the invention, the following is claimed as new and useful, and upon which Letters Patent are desired:

1. A device for actuating the control ram of a tractor-mounted tool member, there being a conduit system to supply fluid to the ram and including a normally closed valve; a device comprising a case mounted on the tractor and in which the valve is secured, a pair of separate but axially alined shafts turnably mounted in the case transversely of the tractor, means connecting one shaft with the valve to open the latter upon rotation of said shaft whereby to actuate the ram and move the tool member, a pendulum rigid with the other shaft, differential gearing connecting the shafts at adjacent ends whereby to impart rotation to said one shaft in one direction upon pendulum-actuated rotation of the other shaft in the opposite direction, a mechanism connected between the ram and said one shaft and functioning upon ram actuation to rotate the one shaft in the opposite direction to close the valve, and hand-actuated means to rotate the one shaft in said one direction independent of the rotation of said other shaft.

2. A device for actuating the control ram of a tractor-mounted tool member, there being a conduit system to supply fluid to the ram and including a normally closed valve; the device comprising a case mounted on the tractor and in which the valve is secured, a pair of separate but axially alined shafts turnably mounted in the case transversely of the tractor, means connecting one shaft with the valve to open the latter upon rotation of said shaft whereby to actuate the ram and move the tool member, a pendulum rigid with the other shaft, differential gearing connecting the shafts at adjacent ends whereby to impart rotation to said one shaft in one direction upon pendulum-actuated rotation of the other shaft in the opposite direction, a yoke turnable on the shafts and straddling the gearing, means releasably and normally holding the yoke against rotation, a bevel gear turnable on said one shaft and connected to the differential gearing, a bevel pinion engaging the bevel gear and having an axial spindle turnably mounted in the yoke, and a mechanism connected between the ram and said spindle and functioning upon such ram actuation to rotate the spindle and impart rotation to the bevel gear and to said one shaft through the differential gearing in the opposite direction to close the valve; said mechanism including a hydraulic cylinder unit connected between the yoke and the spindle of the pinion, another hydraulic cylinder unit mounted on the ram and actuated by ram movement, and conduits connecting corresponding ends of said units.

3. A device for actuating the control ram of a tractor-mounted tool member, there being a conduit system to supply fluid to the ram and including a normally closed valve; the device comprising a case mounted on the tractor and in which the valve is secured, a pair of separate but axially alined shafts turnably mounted in the case transversely of the tractor, means connecting one shaft with the valve to open the latter upon rotation of said shaft whereby to actuate the ram and move the tool member, a pendulum rigid with the other shaft, differential gearing connecting the shafts at adjacent ends whereby to impart rotation to said one shaft in one direction upon pendulum-actuated rotation of the other shaft in the opposite direction, a yoke turnable on the shafts and straddling the gearing, means releasably and normally holding the yoke against rotation, a bevel gear turnable on said one shaft and connected to the differential gearing, a bevel pinion engaging the bevel gear and having an axial spindle turnably mounted in the yoke, a mechanism connected between the ram and said spindle and functioning upon such ram actuation to rotate the spindle and impart rotation to the bevel gear and to said one shaft through the differential gearing in the opposite direction to close the valve, and means to releasably hold the other shaft against rotation; said yoke holding means including a hand lever connected to the yoke exteriorly of the case to rotate the same.

4. A device for actuating the control ram of a tractor-mounted tool member, there being a conduit system to supply fluid to the ram and including a normally closed valve; the device comprising a case mounted on the tractor and in which the valve is secured, a pair of separate but axially alined shafts turnably mounted in the case transversely of the tractor, means connecting one shaft with the valve to open the latter upon rotation of said shaft whereby to actuate the ram and move the tool member, a pendulum rigid with the other shaft, a yoke turnable on the shafts and straddling the adjacent ends thereof, a hand lever connected to the yoke to turn the same and normally held against movement, a bevel gear turnable on said one shaft within the yoke, facing bevel gears on the adjacent ends of the shafts, opposed bevel gears engaging said facing bevel gears and supported from the first named bevel gear, a bevel pinion engaging said first named bevel gear and having an axial spindle turnably mounted in the yoke, a hydraulic cylinder unit connected between the yoke and spindle, another hydraulic cylinder unit mounted on the ram and actuated by ram movement, and conduits connecting corresponding ends of said units.

References Cited in the file of this patent

UNITED STATES PATENTS

| | | |
|---|---|---|
| 2,226,821 | Kempson | Dec. 21, 1940 |
| 2,278,081 | Kramer | Mar. 31, 1942 |
| 2,583,250 | Ball | Jan. 22, 1952 |
| 2,654,349 | Ziskal | Oct. 6, 1953 |
| 2,747,884 | De Vilder | May 29, 1956 |
| 2,763,164 | Neklutin | Sept. 18, 1956 |
| 2,778,130 | Gurries et al. | Jan. 22, 1957 |
| 2,799,250 | Livers | July 16, 1957 |